United States Patent [19]

Burdenko

[11] Patent Number: 5,528,411
[45] Date of Patent: Jun. 18, 1996

[54] RESONANT SCANNER

[75] Inventor: Michael Burdenko, Wellesley, Mass.

[73] Assignee: General Scanning Inc., Watertown, Mass.

[21] Appl. No.: 260,093

[22] Filed: Jun. 15, 1994

Related U.S. Application Data

[63] Continuation of Ser. No. 57,002, May 3, 1993, abandoned.

[51] Int. Cl.[6] .................................................. G02B 26/08
[52] U.S. Cl. ........................... 359/214; 359/221; 359/224
[58] Field of Search ................................. 359/212, 213, 359/214, 221, 224, 226; 310/321, 113

[56] References Cited

U.S. PATENT DOCUMENTS

| | | | |
|---|---|---|---|
| 3,437,393 | 4/1969 | Baker et al. | 359/201 |
| 3,532,408 | 10/1970 | Dostal | 359/214 |
| 3,609,485 | 9/1971 | Dostal | 318/132 |
| 3,959,673 | 5/1976 | Montagu | 310/38 |
| 4,655,543 | 4/1987 | Montagu | 359/214 |
| 4,732,440 | 3/1988 | Gadhok | 359/214 |
| 4,859,846 | 8/1989 | Burrer | 250/234 |
| 4,874,215 | 10/1989 | Montagu | 359/213 |
| 4,878,721 | 11/1989 | Paulsen | 359/214 |
| 4,919,500 | 4/1990 | Paulsen | 359/214 |
| 4,990,808 | 2/1991 | Paulsen | 310/113 |
| 5,048,904 | 9/1991 | Montagu | 359/202 |
| 5,097,356 | 3/1992 | Paulsen | 359/214 |
| 5,121,138 | 6/1992 | Schermer et al. | 358/296 |
| 5,237,444 | 8/1993 | Schermer | 359/202 |

Primary Examiner—Georgia Y. Epps
Assistant Examiner—Thomas Robbins
Attorney, Agent, or Firm—Cesari and McKenna

[57] ABSTRACT

A resonant scanner mounts a mirror on a support that is torsionally compliant, yet stiff in the lateral directions. A torsion bar serves as the torsional spring that resonates with the rotating mass. One end of the bar is rigidly coupled to the mirror, the other end is clamped against rotation. The mirror support effectively prevents lateral movement of the mirror yet it has negligible effect on the resonance characteristics of the scanner. The clamping structure that secures the clamped end of torsion bar is stiff in the lateral direction and compliant in the axial direction, thus preventing lateral movement while accommodating changes in the length of the torsion bar which accompany its twisting action.

8 Claims, 4 Drawing Sheets

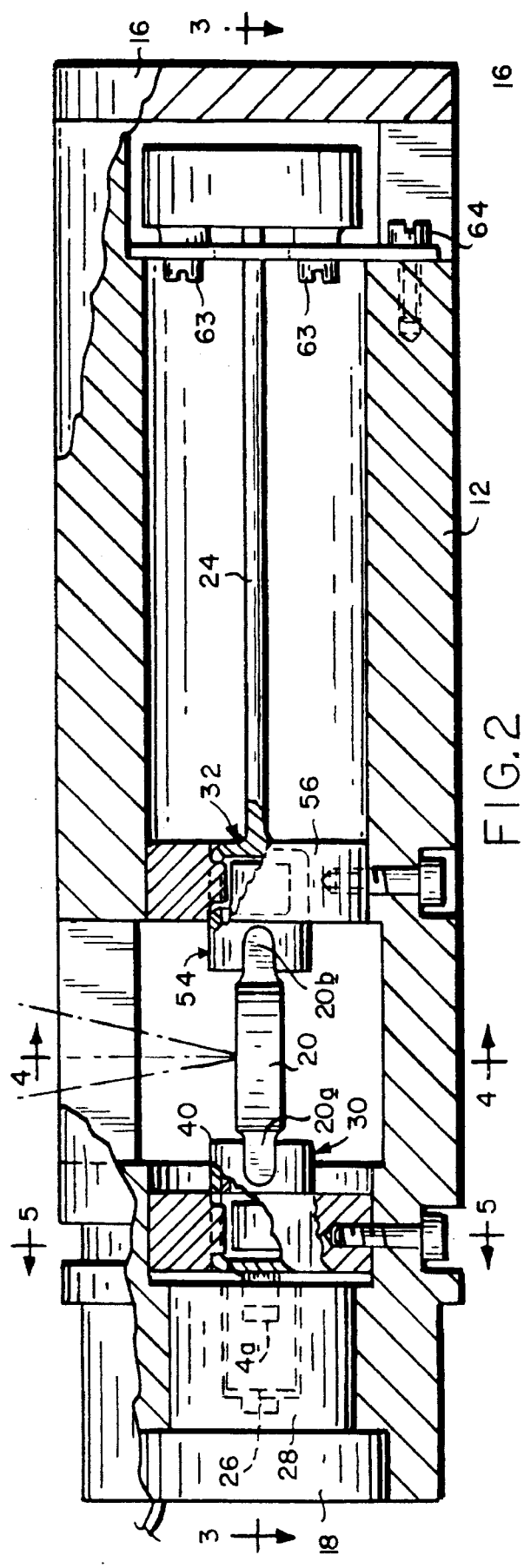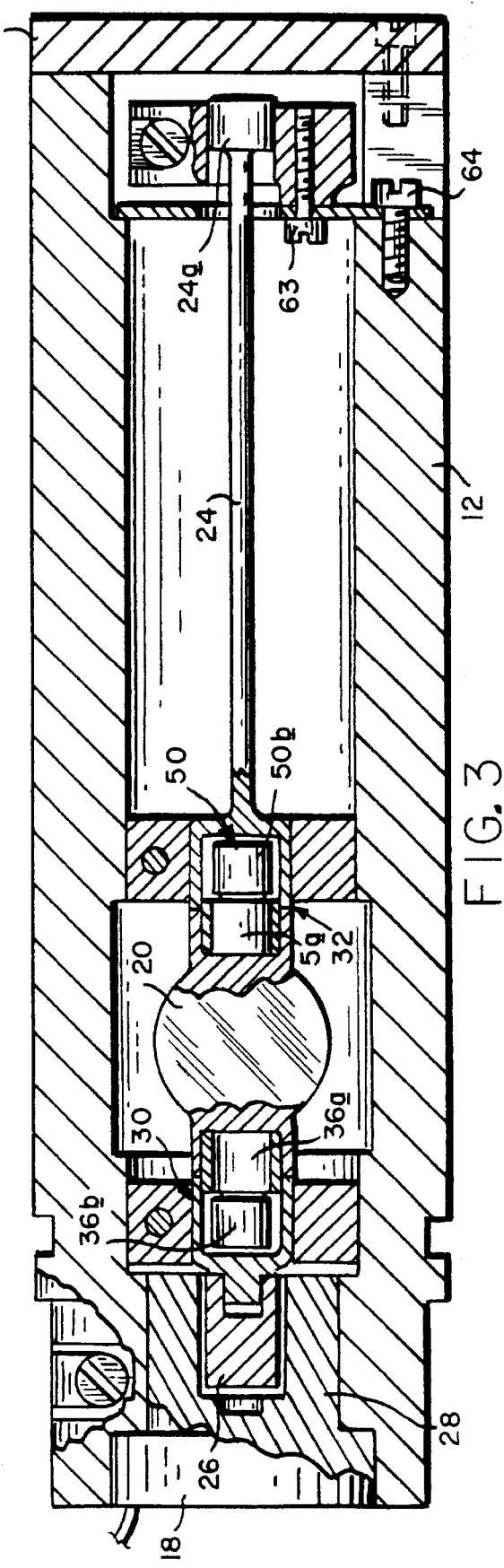

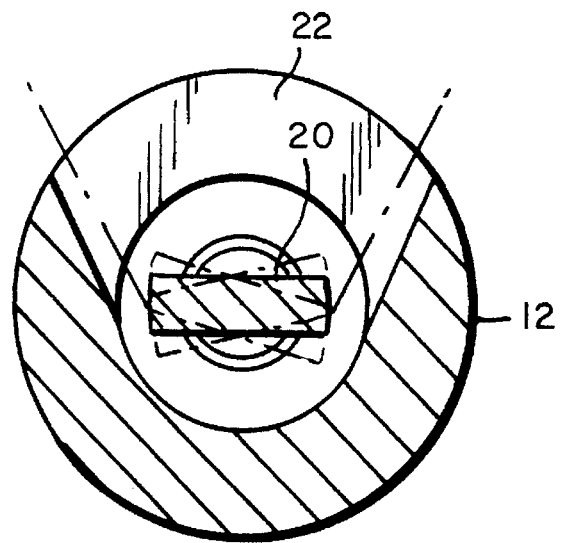
FIG. 4
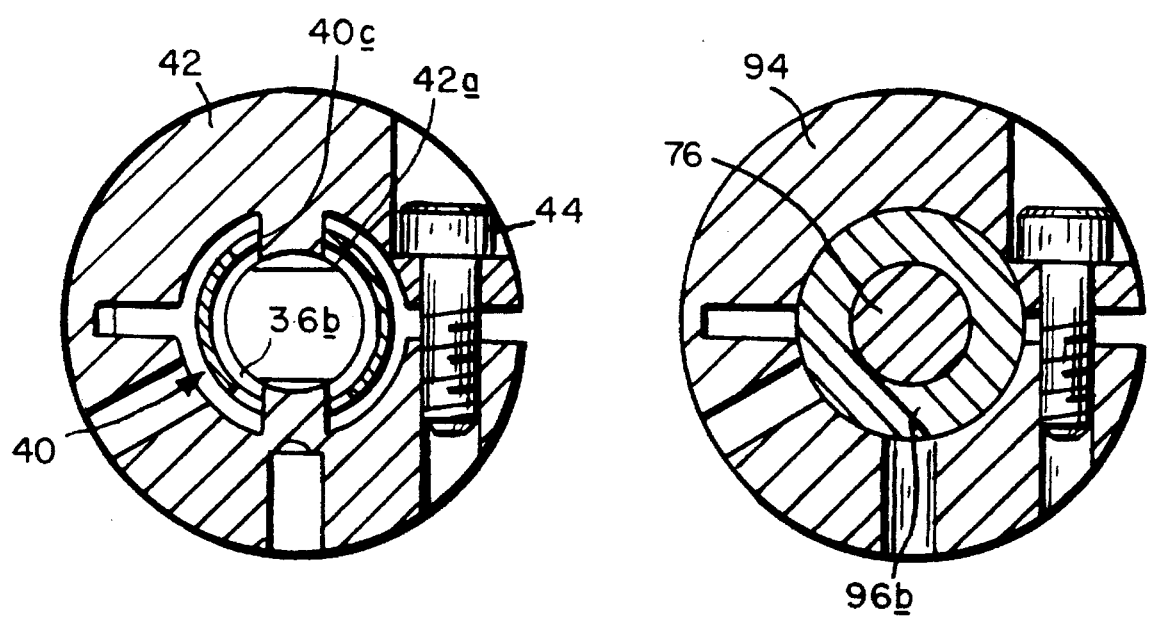
FIG. 5
FIG. 8

RESONANT SCANNER

This application is a continuation of U.S. patent application Ser. No. 08/057,002, filed May 3, 1993, now abandoned.

FIELD OF THE INVENTION

This invention relates to an optical scanner of the type in which an optical element such as a mirror is angularly reciprocated to steer a light beam back and forth. More particularly, the invention relates to a resonant scanner in which the rotating means resonates the elastance of a torsion bar. The invention minimizes lateral vibration of the mirror by providing supports therefor which are stiff in the lateral direction and much more compliant in torsion than the torsion bar.

Resonant scanners are oscillating devices capable of rotating relatively massive optical elements, such as large mirrors, back and forth through large angular excursions at relatively high frequencies. The rotating mass of such a scanner resonates with the elastance of a torsion member to provide these operating characteristics with minimal driving power, assuming of course, that the system is characterized by low energy dissipation.

A particularly important application of these scanners is in laser printers, which record images on photosensitive surfaces by sweeping modulated light beams back and forth over those surfaces in a raster-type arrangement. Usually the source of the light beam is stationary and the scanner rotates a mirror to steer the beam. Resonant scanners are used because they are capable of high-speed operation without the need for high-power drive motors and associated electrical circuitry.

The rotating masses of the scanners must be supported and bearings of various types, which are commonly used to support rotating masses, will not suffice. Specifically, with a frequency of 400 Hz, for example, a scanner undergoes in excess of one million cycles per hour and the lifetime of support bearings is unacceptably short under such conditions. Accordingly, in a number of designs the masses have been supported on the torsion members themselves. However, a torsion member which is suitably compliant for large angular excursions is also relatively compliant in bending modes. Thus, a system configured in this manner is sensitive to external vibrations, which cause lateral vibrations of the mirror and thereby cause corresponding movement of the light beam. With the continuing progression toward finer resolution in the recorded images, ever more stringent accuracy requirements are imposed on the beam-steering mechanism and these requirements cannot be met with the vibration sensitivity of these prior designs.

BACKGROUND OF THE INVENTION

Accordingly, the principal object of the invention is to provide a resonant scanner characterized by high beam-steering accuracy and a long operating life. A more specific object of the invention is to provide a scanner that is relatively immune to the effects of vibrations.

SUMMARY OF THE INVENTION

In a resonant scanner embodying the invention, the mirror-supporting function is separated from the torsional spring function by mounting the mirror on a support that is torsionally compliant, yet stiff in the lateral directions. Specifically, a torsion bar serves as the torsional spring that resonates with the rotating mass. One end of the bar is rigidly coupled to the mirror, while the other end is clamped against rotation. The mirror support effectively prevents lateral movement of the mirror yet it has negligible effect on the resonance characteristics since the torsion bar is much stiffer in rotation.

The clamping structure that secures the clamped end of the torsion bar is stiff in the lateral direction so as to effectively prevent lateral movement of that end of the bar. At the same time, the clamping structure is compliant in the axial direction to accommodate the changes in length of the torsion bar that accompany its twisting action. With this arrangement, the torsion bar is also prevented from vibrating laterally and the mirror is thus free from torsional vibration which might result from coupling between lateral and torsional modes of the torsion bar.

The mirror thus exhibits materially improved stability both dynamically and in the long term. This, in turn, results in improved accuracy in positioning the light beam steered by the mirror.

BRIEF DESCRIPTION OF THE DRAWINGS

The above and further advantages of the invention may be better understood by referring to the following description in conjunction with the accompanying drawings, in which:

FIG. 2 is a longitudinal view, partly in section, of the assembled scanner, taken along line 2—2 of FIG. 1;

FIG. 3 is a view, partly in section, of the scanner of FIG. 1, taken along line 3—3 of FIG. 2;

FIG. 4 is a transverse section, taken along line 4—4 of FIG. 2;

FIG. 5 is a transverse section taken along line 5—5 of FIG. 2.

FIG. 8 is a transverse section along line 8—8 of FIG. 7.

DETAILED DESCRIPTION OF ILLUSTRATIVE EMBODIMENTS

Figure 1:
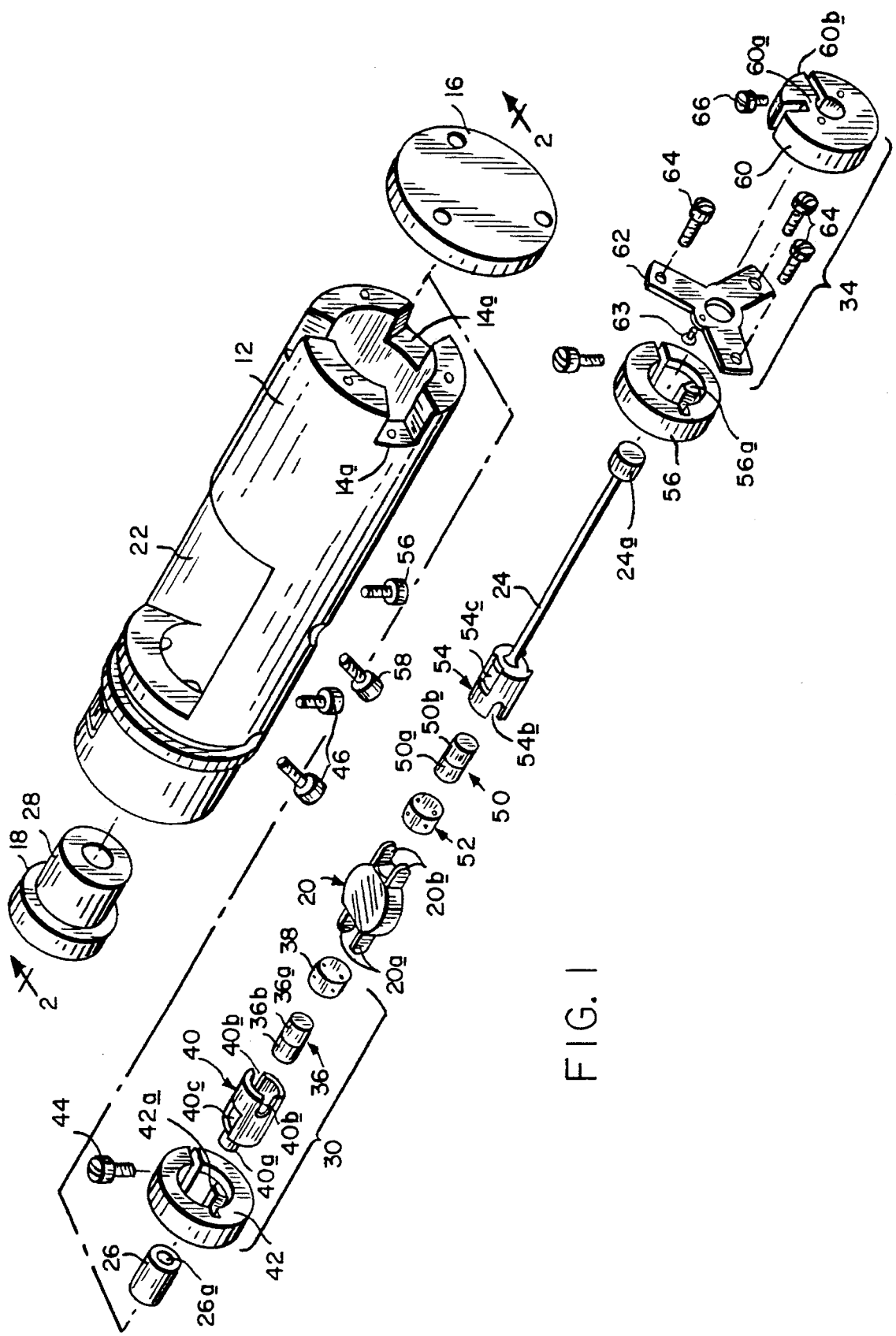
FIG. 1 is an exploded isometric view of a scanner embodying the invention.

As shown in FIGS. 1 and 2, a resonant scanner incorporating the invention includes a housing 12 whose ends are closed by a cap 16 and a plug 18. The housing 12 contains a scanning mirror 20 that is optically accessible through a window 22 in the housing. The mirror is coupled to and resonates with a torsion bar 24. The mirror is rotationally driven by a motor comprising a stator 28, disposed within the end plug 18, and a rotor 26.

The mirror 20 is mounted on a pair of supports 30 and 32 which also support the rotor 26 and one end of the torsion bar 24, respectively. The other end of the torsion bar is mounted in a support 34.

As best seen in FIGS. 1 and 3, the mirror support 30 includes as its core a so-called "Bendix" or flex pivot 36, comprising a pair of tubular sections 36a and 36b. These sections are interconnected by a pair of thin metallic leaves (not shown) disposed in mutually orthogonal planes that pass through the common axis of the sections. With this arrangement, the coupling is highly compliant in torsion but rigid in the axial directions. That is the section 36a is easily rotated through a relatively wide angular range relative to the section 36b, but the sections are essentially locked together with respect to lateral movement.

A spacer tube 38 fits over and is bonded to the coupler section. This provides clearance between a generally tubular extender 40 and the coupler section 36b. The extender 40 fits over and is bonded to the spacer tube 38 and is thus mechanically joined at one end to the coupler section 36a. The other end of the extender has an axially extending stud 40a that mates with and is bonded in a bore 26a in the rotor 26. The mirror 20 has a pair of ears 20a that fit within corresponding key-ways 40b in the extender 40 and are bonded to the tube 38. The support 30 thus provides a rigid mechanical link between the mirror 20 and the rotor 26.

The support 30 also includes a C clamp 42 that has a pair of opposed integral teeth 42a which extend through windows 40c in the extender 40 to engage the coupler section 36b. A screw 44 is used to tighten the clamp so as to lock it to the section 36b and thereby prevent relative rotation between these two parts. The clamp, in turn, is fastened within the housing 12 by means of screws 46 that extend through the barrel 14.

Thus the support 30 prevents lateral movement of the left hand end of the mirror 20 relative to the housing 12, while imposing relatively little restraint on rotation of the mirror. Moreover, as distinguished from the use of a bearing to provide these functions, the support 30 exhibits insignificant energy loss, inserts essentially no noise into the torque characteristic of the rotating system and has a long operating life.

The support 32, at the other end of the mirror 20, has essentially the same construction as the support 30. Thus it includes a coupler 50 having the same construction as the coupler 36, a spacer tube 52 bonded to the coupler section 50a, and an extender 54, that is integral with the torsion bar 24. The extender 54 is bonded to the spacer tube 52, and a C clamp 56 whose teeth 56a extend through windows 54c in the extender clamps the coupler section 50b. Ears 20b, extending from the mirror 20, fit within key-ways 54b in the extender 54 and are bonded to the spacer ring 52. The clamp 56 is fastened within the housing 12 by means of screws 58. This arrangement fixes the right hand end of the mirror 20 and the left hand end of the torsion bar 24 laterally with respect to the housing 12 while imposing relatively little restraint on the rotation of these elements.

The torsion bar support 34 includes a clamp 60 fastened to a spider 62 by means of screws 63. The clamp 60 secures a knob 24a at the right hand end of the torsion bar 24. The spider is fastened to shoulders 14a in the barrel 14 by means of screws 64. The support 34 thus secures the torsion bar knob 24a against rotation relative to the housing 12. At the same time the axial flexibility of the spider 62 permits the axial displacements of the knob that correspond with relative changes in length of the torsion bar 24 in response to temperature changes, as well as the smaller changes in length resulting from twisting and untwisting of the bar during rotations of the mirror 20.

The clamp 60 is relieved as shown to provide a hinge 60a about which a clamping sector 60b rotates when a clamping screw 66 is turned to tighten the clamp on the knob 24a. In order to permit this movement when the knob 24a is being clamped or released, the sector 60b is not fastened to the spider 62.

It will be apparent that the construction described above provides the scanner with a high-Q resonance, long operating life and at the same time, minimal lateral movement relative to the housing 12. The scanner is thus capable of high-speed operation with highly accurate, repeatable steering of the light beam reflected from the mirror 20.

In cases where the accuracy requirements of the scanner are less stringent, the support 32 can be omitted. In that case the torsion bar 24 would have a knob at its left hand end to which the ears 20b of the mirror 20 would bond. This will provide a less expensive construction, but with somewhat greater susceptibility of the mirror to lateral vibration. An arrangement of this nature is used in the embodiment of the invention shown in FIG. 6.

Figure 6:
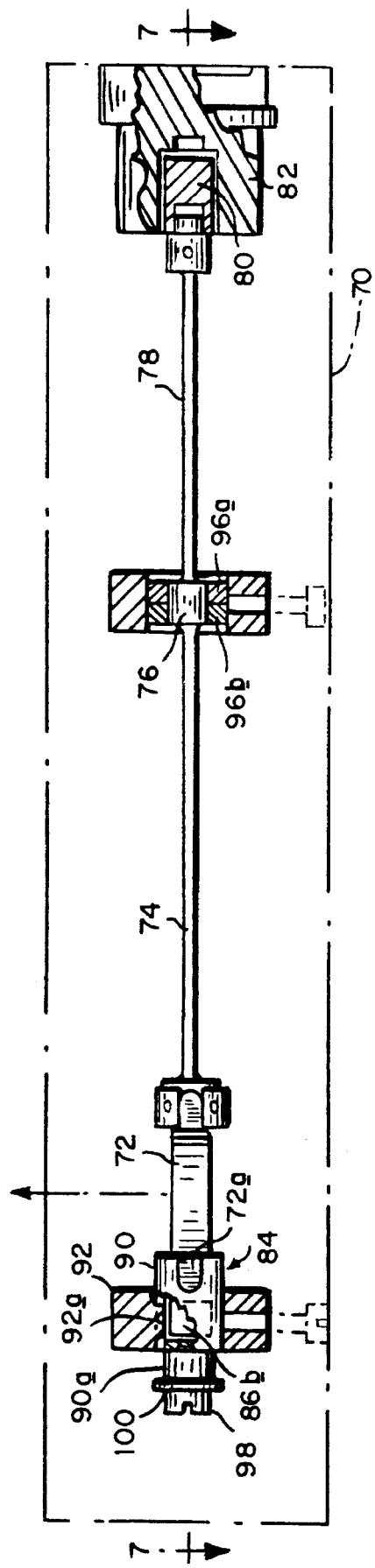
FIG. 6 is a longitudinal view, partly in section, of a second embodiment of the invention, having a reactionless torque characteristic.
Figure 7:
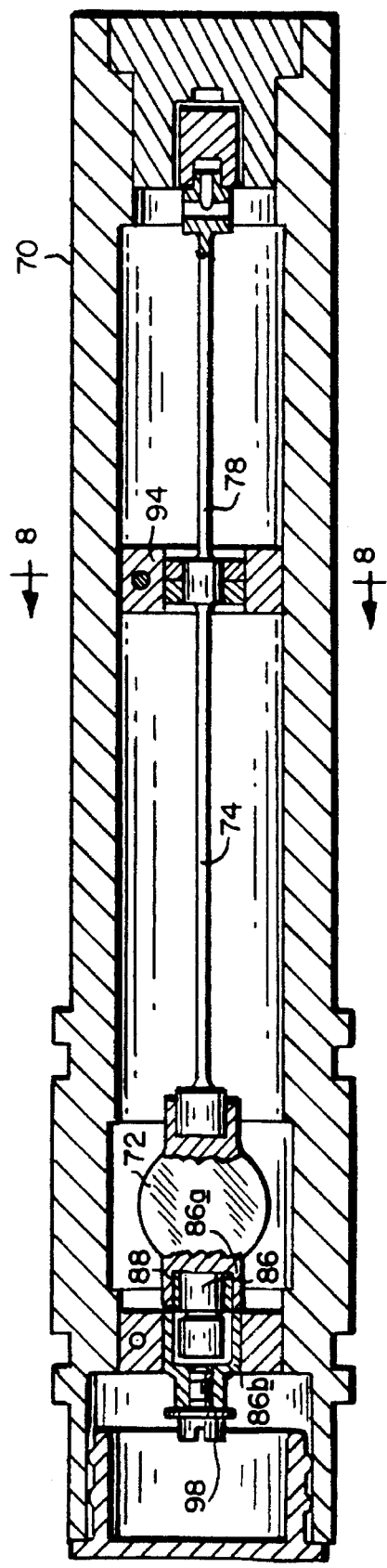
FIG. 7 is a longitudinal section taken along line 7—7 of FIG. 6.

In FIG. 6 I have depicted another embodiment of the scanner that applies essentially zero net torque to its housing 70, as contrasted with the scanner of FIGS. 1–5, in which the clamp 34 couples the oscillating torque in the torsion bar 24 to the housing 12. In FIG. 6 a mirror 72 is rigidly connected to a torsion bar 74 whose other end terminates in a knob 76, common with a torsion bar 78. The other end of the torsion bar 78 is rigidly connected to the rotor 80 of a motor whose stator is shown at 82. At its other end the mirror 72 is retained in place by a support 84 of the same type as the supports 30 and 32 of FIGS. 1–4. More specifically, the support 84 comprises a Bendix coupler 86 having tubular sections 86a and 86b. A spacer tube 88 fits over and is bonded to the tube section 86a and an extender 90 is bonded, in turn, to the tube 88. The mirror 72 has ears 72a that fit within keyways in the extender 90 and are also bonded to the tube 88. A clamp 92 that is secured to the housing 70 has teeth 92a that extend through windows (not shown) in the extender to clamp the coupler tube section 86b. The support 84 thus operates in the same manner as the supports 30 and 32 and with the features and advantages of those supports as described above.

With further reference to FIG. 6, the knob 76 is secured in place by a C clamp 94 that is secured to the housing 70. Specifically, elastomeric rings 96a and 96b are compressed between the clamp 94 and the knob 76 with sufficient force to prevent significant lateral movement of the knob with respect to the housing 70. In the illustrated embodiment the rotor 80 is cantilevered at the right hand end of the torsion bar 78.

The spring constants of the torsion bars 74 and 78 and the masses of the elements connected at their outer ends are such that at the resonant frequency of the system there is a rotational node at the knob 76. Thus the mirror 72 rotates in a direction opposite to that of the rotor 80 and the torsion bars 74 and 78 exert equal and opposite torques on the housing 70 through the clamp 94. The net torque exerted on the housing is therefore essentially zero.

The extender 90 in FIG. 6 includes a threaded stub 90a at its left end. The stub 90a accommodates a screw 98 that retains in place one or more washers 100. The washers 100 provide mass to tune the rotating system to provide the desired resonant frequency. To accommodate this tuning arrangement, the system is constructed with the mass of the mirror 72 and attached elements deliberately lower than that required for the desired mode of operation.

What is claimed is:

1. A resonant optical scanner for moving a beam angularly about an axis, said scanner comprising:

A) a housing,

B) an optical element having first and second ends,

C) a torsionally elastic element having first and second ends, said first end being connected to said first end of said optical element, D) a first support clamping said second end of said elastic element against rotation relative to said housing, E) a second support having
   i) a coupling comprising first and second members connected to each other elastically for rotation about said axis and rigidly for relative movement laterally with respect to said axis,
   ii) means rigidly connecting said first member to said housing so as to restrain said first member against lateral displacement relative to said housing, and
   iii) means rigidly connecting said second member to the second end of said optical element, and F) a motor having a rotor connected to reciprocally rotate said optical element.

2. The scanner defined in claim 1 in which the torque in said coupling as a function of the angular displacement of said optical element is substantially less than that of said torsionally elastic element, whereby the resonant frequency of said scanner is determined primarily by the spring constant of said elastic element and the moment of inertia of the rotating mass of said scanner with respect to said axis.

3. The scanner defined in claim 1 in which said rotor is rigidly connected to said optical element.

4. The scanner defined in claim 1 including means rigidly connecting said rotor to said second member of said second support.

5. The scanner defined in claim 1 in which said first support is axially compliant, thereby accommodating changes in the length of said elastic element.

6. The scanner defined in claim 1 including a third support having:
   A) a coupling comprising first and second members connected to each other elastically for rotation about said axis and rigidly for relative movement laterally with respect to said axis,
   B) means rigidly connecting said first member to said housing so as to restrain said first member against lateral displacement relative to said housing, and
   C) means rigidly connecting the first end of said optical element to said second member.

7. The scanner defined in claim 1 including:
   A) a second torsionally elastic element having first and second ends, said first end being rigidly connected to said second end of said first torsional elastic element, and
   B) a motor having a rotor rigidly connected to said second end of said second elastic element, whereby the torque applied to said housing through said second support is substantially zero.

8. The scanner defined in claim 1 including means rigidly connecting said rotor to, and supporting said rotor from, said second member of said second support.

* * * * *